Figure 1:
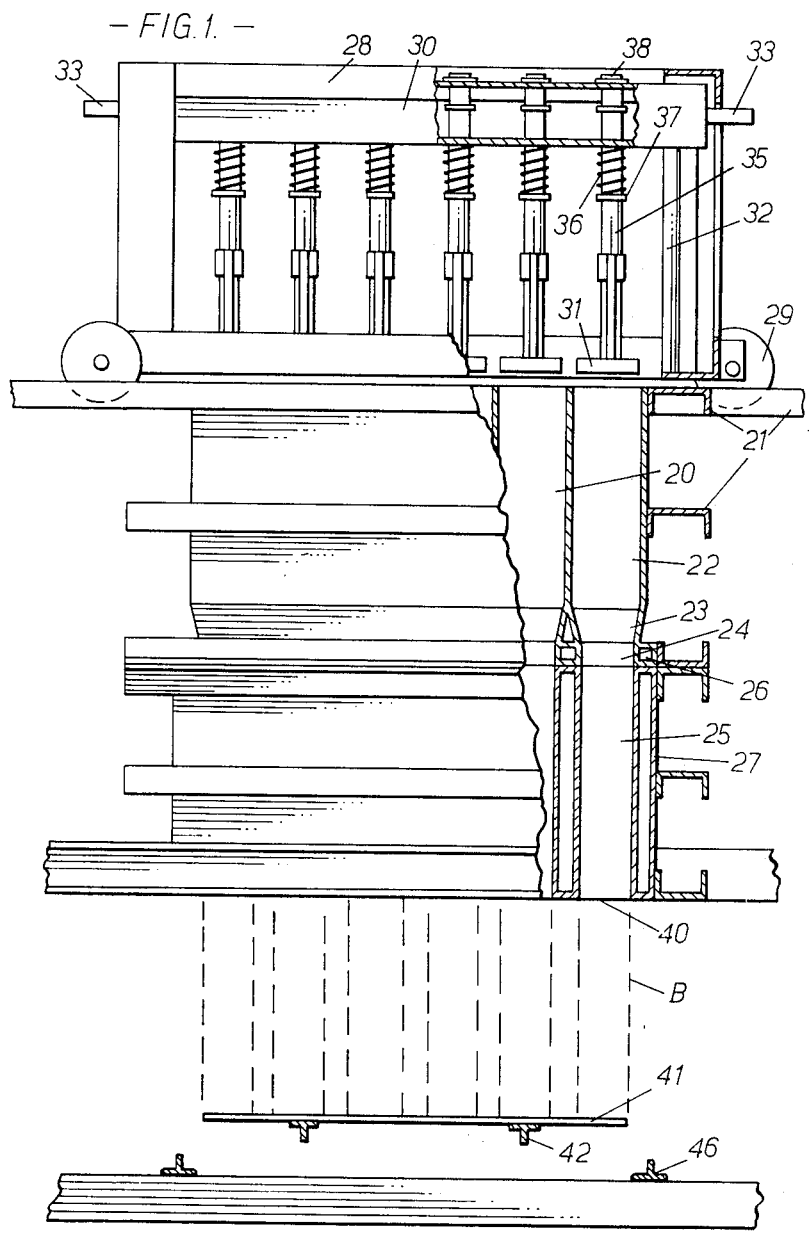

March 29, 1966 E. SOLA 3,242,684

FREEZING FOODSTUFFS

Filed Jan. 26, 1965 3 Sheets-Sheet 1

INVENTOR:
EINAR SOLA.

March 29, 1966  E. SOLA  3,242,684
FREEZING FOODSTUFFS

Filed Jan. 26, 1965  3 Sheets-Sheet 2

INVENTOR:
EINAR SOLA.
BY McGlew and Toren
ATTORNEYS

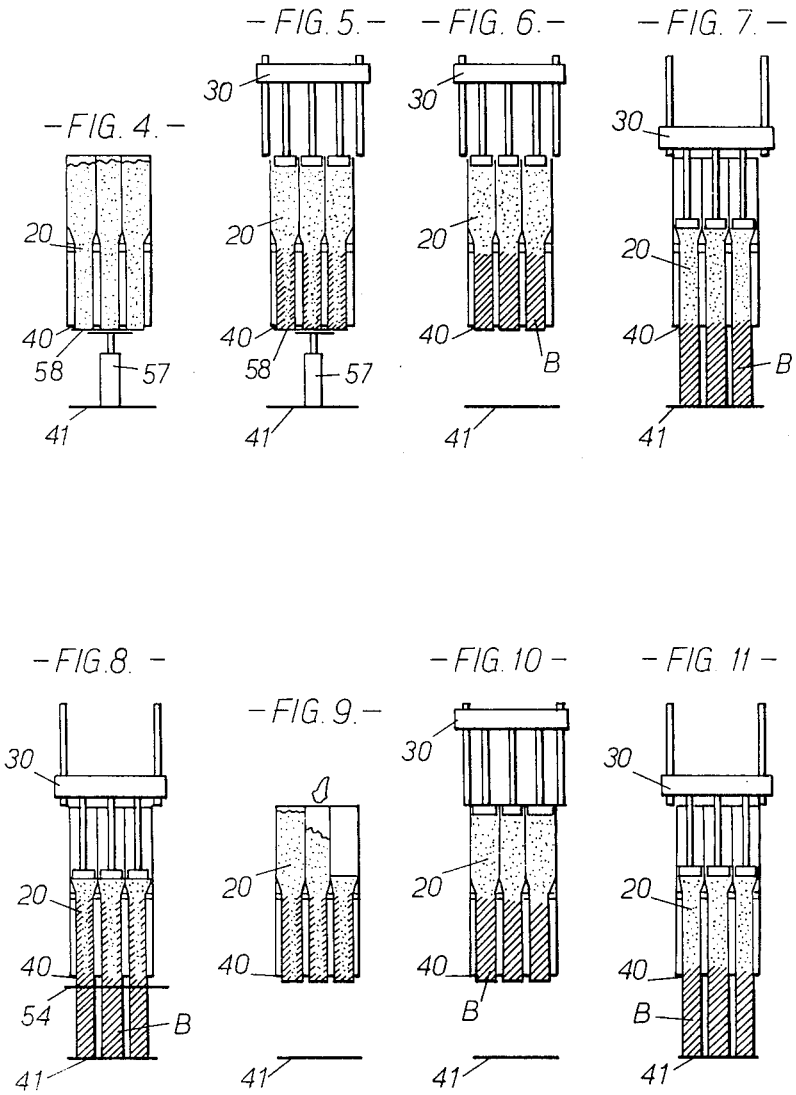

United States Patent Office 3,242,684
Patented Mar. 29, 1966

3,242,684
FREEZING FOODSTUFFS
Einar Sola, Bergen, Norway, assignor to Fiskeridirektoratets Kjemisk-Tekniske Forskningsinstitutt, Bergen, Norway
Filed Jan. 26, 1965, Ser. No. 428,157
15 Claims. (Cl. 62—65)

This invention relates to freezing foodstuffs, especially foodstuffs of irregular form, such as fish fillets and whale meat.

It is an object of the invention to provide good packing-together of the foodstuffs in passages of fixed cross-section.

According to the present invention a continuous foodstuff process comprises the steps of (a) filling an open-ended passage consisting of a packing zone and a freezing zone separated by a heating zone, by introducing irregularly shaped pieces of food into its feed end while its opposite discharge end is temporarily closed, (b) packing said pieces together and freezing the packed food occupying the freezing zone to form a frozen food block, (c) applying heat to the freezing zone so as to thaw said block loose therefrom, (d) displacing said block through said discharge end to a position at which its outer end is supported and simultaneously re-filling the freezing zone with the packed food previously occupying the freezing zone, (e) partially freezing at least a portion of the contents of the freezing zone, separating and removing said food block and reintroducing and packing together further pieces of food in the packing zone while wholly freezing the contents of the freezing zone to form a further frozen food block, and (f) repeating process steps (c), (d) and (e).

Conveniently, each frozen food block is displaced so that its outer end is supported at a distance from the discharge end of the passage, of less than the length of the block.

Moreover, it is preferred that the packed food be subjected to a lateral pressure at the outlet of the packing zone, on passing from the latter to the freezing zone via the heating zone and that heat is supplied to the heating zone during the freezing of the packed food.

The invention also includes an apparatus for carrying out this pocess which comprises a main structure having internal walls defining an open-ended passage consisting of a packing zone and a freezing zone, respectively adjacent feed and discharge ends of said passage, and separated by a heating zone, means for applying pressure directly to irregularly shaped pieces of food in the packing zone, said pressure-applying means being movable away from the packing zone to permit the addition of additional food pieces at the feed end, adjustable means for opening and closing said discharge end, means for supplying heat to the heating zone, means for cooling and for supplying heat to the freezing zone, means for supporting the outer end of a frozen food block projecting from the discharge end of the passage, and means for successively separating a frozen food block while the latter abuts the supporting means.

It is convenient to have the supporting means disposed at a distance from the discharge end of the passage which is less than the length of the freezing zone, said supporting means being displaceable away from the discharge end so as to permit a separated frozen block to be readily removed.

Preferably, the outlet end of the packing zone tapers in the direction of the heating zone. It is also desirable that the packing zone has a greater volume than the freezing zone and that the heating zone has a volume which is small in comparison with the volume of either the packing or the freezing zone, while its cross-sectional area is substantially the same as that of the freezing zone.

In one aspect of the invention, an apparatus comprises a plurality of open-ended passages each receiving a corresponding one of an equal number of pistons having spring loadings which are independently adjustable.

Figure 2:
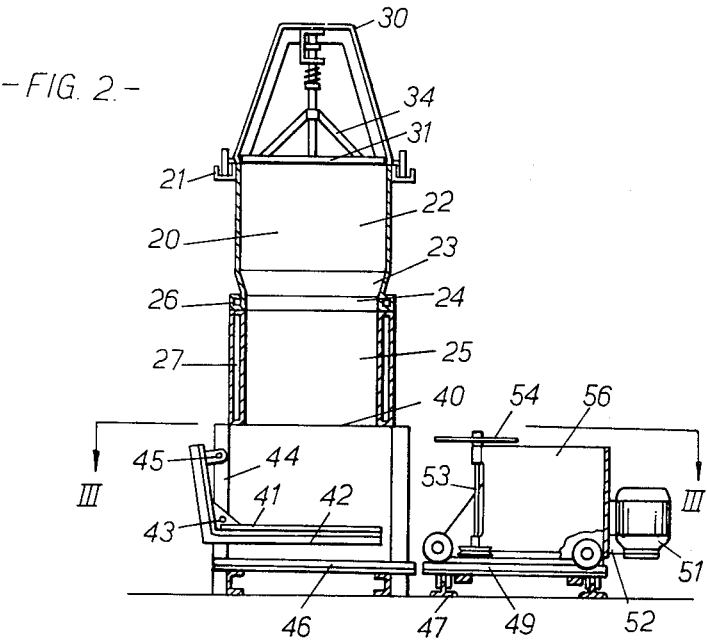
Figure 3:
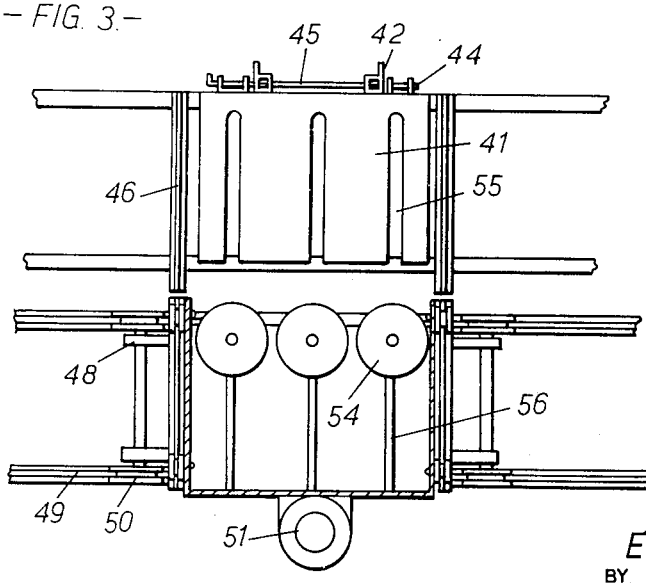

In order that the invention can be more clearly understood, a convenient embodiment thereof will now be described, by way of example, having regard to the accompanying drawings in which:

FIGURE 1 is a schematic view, partly in section, of an apparatus constructed in accordance with the invention, FIGURE 2 is a side view, partly in section, of the apparatus shown in FIGURE 1, but on a smaller scale, FIGURE 3 is a section on the line III—III of FIGURE 2, FIGURES 4 to 7 illustrate four steps in a starting operation utilising the apparatus of FIGURES 1, 2 and 3, and FIGURES 8 to 11 illustrate four steps in a working operation utilising this apparatus.

Referring to FIGURES 1 to 3, a pocket freezer is provided with six pockets 20, of which only some are shown, in section, in FIGURE 1, which are arranged side-by-side, the walls being held together by welded passage sections 21 and T-sections. Each pocket is open above and below, being provided at the top with a packing zone 22 with plane, parallel walls forming partitions with adjacent pockets. The packing zone is terminated below by a funnel-shaped portion 23 which passes to a heating zone 24 which, in turn, passes to a freezing zone 25 having plane and parallel walls and a considerably smaller volume than the packing zone. Moreover, the volume of the heating zone 24 is small in comparison with the volume of either the packing or the freezing zone. In the heating zone 24, there is formed around each pocket, a chamber 26 for the circulation of hot gas, hot brine or for the reception of an electric heating element, while in the freezing zone, there is a chamber 27 for the circulation of freezing medium. For the sake of clarity, regulating means and conduits for the heating means and the freezing means have been omitted.

One set of the sections 21, which are of channel shape, are arranged at the top of the pocket freezer and have their channel portions upwardly directed to form a driving path for a pressure-applying means or press 28 which runs on wheels 29. The press 28 can, if desired, operate a plurality of pocket freezers in a larger arrangement. The press 28 consists of a rail 30 of inverted channel shape supporting six pistons 31 which are each able to cooperate with a corresponding one of the pockets 20 of the pocket freezer. By means of the wheels 29, the press 28 can be displaced to a position at which the top of the pocket freezer is made free for filling with articles of food which are to be frozen, and to another position at which the pistons can operate with the pockets 20, so as to produce the desired pressure in each pocket.

The rail 30 is supported on screw spindles 32 by means of their respective cooperating nuts 33 located at each end of the rail. The rail 30 can be displaced vertically and parallel to the top of the pocket freezer, by means of a prime mover (not shown) having a chain drive to both nuts 33.

As is evident from FIGURE 2, the pistons are of elongated shape and are propped underneath by inclined pins 34 to the piston rods 35. The piston rods 35 each carry a compression spring mounted between an abutment 37 and the under side of the rail 30. Between flanges on the rail 30 and on the upper side of the rail, there are arranged stops 38, which permit a piston rod 35 to be displaced vertically relatively to the rail 30 over a certain distance, against the force of compression spring 36. Each piston rod is consequently adapted to be displaced vertically relative to the rail and independently of the remaining piston rods.

Below, and a substantial distance from, the discharge opening 40 of the pocket freezer (see FIGS. 1 and 2), there is arranged an abutment consisting of a plate 41 supported by angle arms 42 which are pivotably mounted at 43 in a stand 44. The arms 42 are adapted to be locked fast to the stand by means of a locking bolt 45, with the plate 41 extending horizontally. When the locking engagement is released, the plate 41 can be pivoted downwards somewhat towards the base.

Extending below the plate 41 are two rails 46 and in front of the pocket freezer, at a height just beneath the rails 46, two additional rails 47 extend in a transverse direction. The rails 47 can extend past a plurality of pocket freezers arranged in series (not shown). On the rails 47 runs a carriage 48 which supports, transversely of rails 47, a pair of rails 49 which are arranged at the same height and in the same direction as the rails 46. On the rails 49 there is, furthermore, supported a carriage 50 which is equipped with a motor 51 having a belt drive or chain drive 52 connected to three parallel shafts 53 each of which support a rotatable saw blade 54. The saw blades are disposed at a height just below the level of the discharge opening 40 and are adapted to be moved with approximately half of each saw blade below the discharge opening of two adjacent pockets. In the plate 41 grooves 55 are cut out for the shaft 53 and their supporting means 56, which grooves run parallel to the rails 46, 49.

A convenient process for carrying out the invention will now be described in two phases, namely a starting operation and a working operation, with particular reference to FIGURES 4 to 11, which represent a considerable simplification of the arrangement shown in FIGURE 1.

The two operations can be conveniently divided up into the following stages 1 to 8:

STARTING OPERATION (1) A jack 57 is first positioned to rest on the plate 41 having a plate 58 arranged facing the discharge opening 40 (see FIG. 4). The food, which in the present case is in the form of fish fillets, is introduced into the pocket freezer from the top, the rail 30 having been pushed to the side so as to make the top of the pocket freezer free. The pockets are filled with the fillets as evenly as possible. However, the depth of this initial filling will be large, as both the freezing zone and the packing zone have to be filled, so that fairly disorderly filling of the freezer pockets must be anticipated. In the subsequent operation following the starting operation, conditions are better for even filling.

(2) The press is then moved over the pocket freezer and the fillets are pressed together in both the freezing zone and the packing zone (see FIG. 5). Since the piston rods are resilient relative to the rail 30, the springs are able to yield when the desired pressure is attained, so that on filling the pockets variations in filling from pocket to pocket can be allowed for. At the same time, movement of the springs will also serve as a control for the press being sufficiently screwed down. After the desired pressure is attained freezing is begun. If desired, the heating of the heating zone by the chamber 26 can be undertaken at the same time, so that fast freezing of the food above the upper edge of the freezing chamber 27 is prevented.

During freezing, the press can be screwed down, the pockets remaining under pressure the whole time. However, it must be remembered that when freezing has progressed for a time and a suitably thick layer of frozen fillet is formed on each side of a block B thereof, which layer will be frozen fast to the walls in the freezing zone, that the pressure can be released without the risk of the fillets expanding back to their original condition. It will, therefore, not be necessary for the pistons to remain screwed down during the whole of the freezing period, but they can be raised after a time and, if desired, utilised on other pocket freezers by simply displacing the press on the roller track at the top of the pocket freezer.

During freezing, the blocks B in the freezer pockets have full opportunity to expand up into the overlying portion of the food in the packing zone so as to prevent the occurrence of too large a pressure loading on the channel walls, something for which provision can be made by removing the pistons or allowing them to be displaced a small distance against the pressure of the compression springs. As the pistons are only adapted to be displaced in the packing zone, which is separated from the freezing zone by the heating zone, there will be no risk of the pistons freezing fast and, as a result, causing the apparatus to be subjected to large pressure loadings.

(3) The freezing is then interrupted (FIG. 6), the jack 57 and the plate 58 being removed. Heating medium is supplied to the freezing chamber 27, for example, a suitably heated brine or heated gas due to freezing by direct evaporation.

(4) When the blocks B are thawed loose from the walls of the pocket freezer, the pistons are pressed downwards and the frozen blocks B are displaced outwards from the pocket freezer and against the plate 41, at the same time as the freezing zone is filled with fillets from the packing zone which has previously been pressed together (FIG. 7).

It must be noted, in particular, that the plate 41 is arranged at a distance from the discharge opening which is less than the height of a final frozen block, so that the upper end of the block is received in a pocket of the pocket freezer and forms a barrier to subsequent portions of the food which, as yet, have not been frozen. By making the volume of the packing zone greater than the volume of the freezing zone, it is ensured that the fillets are filled sufficiently high above the top of the freezing zone. The funnel portion 23 will also apply a lateral pressure to the fillets, in addition to the vertically directed pressure, when they are conveyed into the freezing zone 25.

After the blocks B are moved against the plate 41, the starting operation is complete and the working operation can be begun, as is illustrated in FIGS. 8 to 11.

WORKING OPERATION (5) Freezing is begun afresh, the blocks B which have been moved against the plate 41 being held in position thereupon until those portions of the blocks which extend upwards into the pocket freezer are once again frozen fast to the walls of the corresponding pockets. When this occurs, the column of overlying foodstuffs can be supported and the portions of the blocks which are pushed outside the pocket freezer, are divided up into either large blocks or into smaller regular units at suitable block heights by means of the saw blades 54 (FIG. 8). The column of unfrozen or only partially frozen fillets is frozen to the residual portion of the block in the pocket freezer, so as to produce a continuous block.

(6) After division, the pieces of block can be easily removed (FIG. 9) from the plate 41 by releasing the locking engagement of the locking bolts 45 (see FIGS. 2 and 3) so that the plate can be pivoted downwards towards the base. The top of the pocket freezer is then made free for filling the pockets with fish fillets. Now, only the packing zone is fed fillets so that this can, therefore, be effected in a far more orderly manner than in the first step of the starting operation (see FIG. 4). The freezing of the fillets is also effected during the whole of the filling step, without the risk of the goods in the freezing zone expanding back to their original form.

(7) After completion of the filling operation, the press is pushed into position over the pocket freezer, the necessary pressure is established for pressing the goods together (FIG. 10) and the blocks B are finally frozen in the freezing zone.

(8) The blocks B are thawed off from the walls and are pressed outwards from the pocket freezer (FIG. 11) as is indicated during the fourth step of the starting operation (FIG. 7). The blocks will now form a barrier for the following overlying column of fillets in the pocket freezer, so that the latter are ready for the new working operation.

It must be noted that with such a repeating working operation, blocks are pushed outwards from the pocket freezer continuously and are divided up as required or desired. Moreover, this process does not require that the fillets be fed in exactly similar quantities at each filling, since provision is made for some variation owing to the volume of the packing zone being larger than that of the freezing zone.

What I claim is:

1. A continuous foodstuff freezing process which comprises the steps of (a) filling an open ended passage consisting of a packing zone and a freezing zone separated by a heating zone, by introducing irregularly shaped pieces of food into its feed end while its opposite discharge end is temporarily closed, (b) packing said pieces together and freezing the packed food occupying the freezing zone to form a frozen food block, (c) heating the block in the freezing zone so as to thaw said block loose therefrom, (d) displacing said block through said discharge end to a position at which its outer end is supported and simultaneously re-filling the freezing zone with the packed food previously occupying the freezing zone, (e) partially freezing at least a portion of the contents of the freezing zone, separating and removing said food block and re-introducing and packing together further pieces of food in the packing zone while wholly freezing the contents of the freezing zone to form a further frozen food block, and (f) repeating process steps (c), (d) and (e).

2. A process according to claim 1, in which the packed food is subjected to a lateral pressure at the outlet end of the packing zone on passing from the latter to the freezing zone via the heating zone.

3. A process according to claim 1, in which heat is supplied to the heating zone during freezing of the contents of the packing zone.

4. A process according to claim 1, in which each frozen food block is displaced so that its outer end is supported at a distance from the discharge end of the passage, less than the length of the block.

5. A process according to claim 1, in which the volume of the packing zone is greater than the volume of the freezing zone.

6. A process according to claim 1, in which the volume of the packing zone is greater than the volume of the freezing zone, the heating zone having a volume which is small is comparison with the volume of either the packing or the freezing zone, but having substantially the same cross-sectional area as that of the freezing zone.

7. An apparatus for continuously freezing foodstuffs which comprises a main structure having internal walls defining an open-ended passage, means defining a packing zone, a heating zone and a freezing zone in said passage arranged consecutively from a feed to a discharge end of said passage, means for applying pressure directly to irregularly shaped pieces of food in the packing zone, said pressure-applying means being movable away from the packing zone to permit the addition of additional food pieces at the feed end, adjustable means for opening and closing said discharge end, means for supporting the outer end of a frozen food block projecting from the discharge end of the passage, and means for successively separating a frozen food block while the latter abuts the supporting means.

8. An apparatus according to claim 7, wherein the outlet end of the packing zone tapers in the direction of the heating zone, thereby causing packed food to be subjected to lateral pressure on passing from the packing zone to the freezing zone via the heating zone.

9. An apparatus according to claim 7, wherein the supporting means for a frozen food block is disposed at a distance from the discharge end of the passage which is less than the length of the freezing zone, said supporting means being displaceable away from said discharge end.

10. An apparatus according to claim 7, wherein the volume of the packing zone is greater than the volume of the freezing zone.

11. An apparatus according to claim 7, wherein the volume of the packing zone is greater than the volume of the freezing zone and the heating zone has a volume which is small in comparison with the volume of either the packing zone or the freezing zone, but has a cross-sectional area substantially the same as that of the freezing zone.

12. An apparatus according to claim 7, wherein the pressure-applying means comprises an adjustably spring-loaded piston.

13. An apparatus according to claim 7, wherein the separating means comprises a power-driven severing device which is adjustable for cutting off various lengths of frozen food from a given block.

14. An apparatus according to claim 7, wherein the adjustable means for opening and closing the discharge end comprises a plate supported by a jack.

15. An apparatus for continuously freezing foodstuffs which comprises a main structure formed with internal walls defining a plurality of individual open-ended passages arranged side-by-side, each passage consisting of a packing zone and a freezing zone, respectively adjacent feed and discharge ends thereof and separated by a heating zone, the said walls in the region of the outlet end of the packing zone tapering in the direction of the heating zone thereby causing packed food to be subjected to lateral pressure on passing from the packing zone to the freezing zone via the heating zone, a plurality of independently adjustable spring-loaded pistons each adapted to apply pressure directly to irregularly shaped pieces of food in a corresponding one of the packing zones, said pistons being jointly removable from their packing zones to permit the introduction of food pieces at the various feed ends of the passages, adjustable means for opening and closing the various discharge ends, means for supporting outer ends of frozen food blocks projecting from discharge ends of the passages, said supporting means being disposed at a distance from the discharge ends which is less than the length of a freezing zone and being displaceable away from said discharge ends, and power-driven severing means for successively separating blocks of frozen food abutting the separating means, said severing means being adjustable for cutting off various lengths of frozen food from a given series of blocks, and wherein the walls of each passage define a packing zone having a volume greater than the volume of the freezing zone and a heating zone having a volume which is small in comparison with the volume of either the packing zone or the freezing zone, but with a cross-sectional area substantially the same as that of the freezing zone.

References Cited by the Examiner

UNITED STATES PATENTS

| 1,963,842 | 6/1934 | Gay | 62—71 |
| 2,631,440 | 3/1953 | Polk | 63—341 X |
| 2,993,345 | 7/1961 | Franklin | 62—341 X |

ROBERT A. O'LEARY, *Primary Examiner.*

W. E. WAYNER, *Assistant Examiner.*